United States Patent [19]
Ostrowski

[11] 3,823,798
[45] July 16, 1974

[54] PLURAL SELF-ENERGIZING SPREADING DISC BRAKE ASSEMBLY

[75] Inventor: Piotr Ostrowski, Sutton Coldfield, England

[73] Assignee: Girling Limited, Birmingham, England

[22] Filed: June 30, 1972

[21] Appl. No.: 267,991

[30] Foreign Application Priority Data
July 3, 1971    Great Britain.................... 31262/71

[52] U.S. Cl.................................. 188/71.4, 192/70
[51] Int. Cl............................................. F16d 55/04
[58] Field of Search............ 188/71.4, 72.2; 192/70, 192/48.8, 48.9, 48.91, 93 A

[56] References Cited
UNITED STATES PATENTS

| | | | |
|---|---|---|---|
| 2,387,039 | 10/1945 | Parrett............................. | 188/71.4 |
| 2,801,719 | 8/1957 | Clerk.............................. | 192/70 X |
| 3,583,529 | 6/1971 | Robinson....................... | 188/72.2 X |

Primary Examiner—George E. A. Halvosa
Attorney, Agent, or Firm—Scrivener Parker Scrivener & Clarke

[57] ABSTRACT

In a brake assembly incorporating two brakes of the self-energising spreading disc type the brakes are located side-by-side in a stationary housing with the friction discs of both brakes on a common shaft, and the torque on the pressure plates of both brakes is taken by a common pin mounted in the housing with its axis parallel to that of the shaft.

3 Claims, 3 Drawing Figures

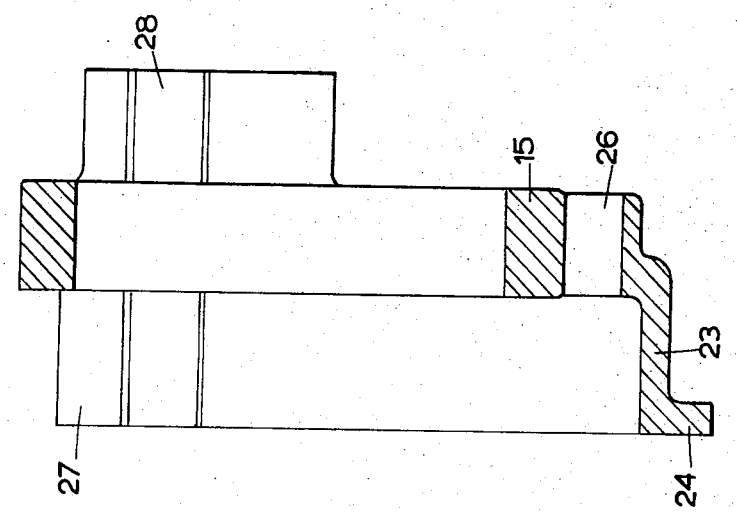
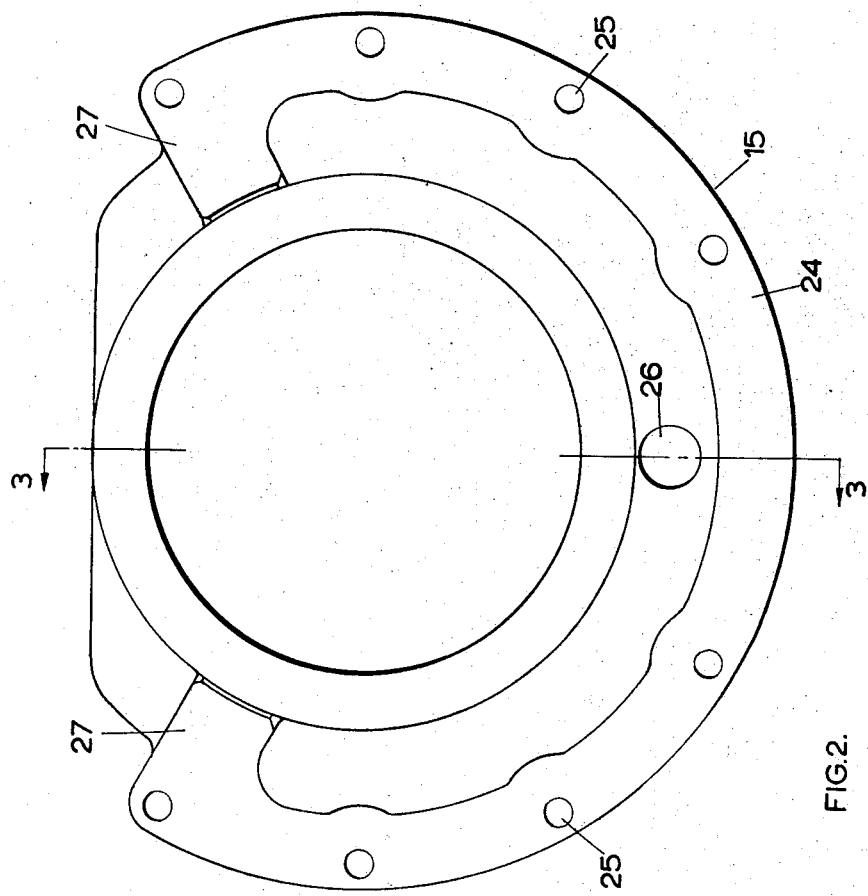

PLURAL SELF-ENERGIZING SPREADING DISC BRAKE ASSEMBLY

This invention relates to improvements in self-energising disc brakes of the kind in which rotatable friction discs are adapted to be brought into engagement with opposed radial surfaces in a stationary housing by pressure plates located between the friction discs and centred by pilot lugs on the housing. Balls are located in co-operating oppositely inclined recesses in the adjacent faces of the pressure plates and the application of the brake is initiated by moving the pressure plates angularly in opposite directions, the pressure plates then moving apart into engagement with the friction discs which are urged into engagement with the radial surfaces in the housing. The pressure plates are carried round with the friction discs until one is arrested by the engagement of a lug on the plate with a stop abutment in the housing and the continued angular movement of the other pressure plate provides a servo action.

Self-energising brakes of that kind are commonly used on tractors and like vehicles and are hereinafter called brakes of the kind set forth.

The angular movement of the pressure plates to initiate the application of the brake is commonly effected mechanically by a pair of toggle links connected between radially projecting lugs on the plates, a pull-rod being connected to the junction of the links.

According to our invention two self-energising disc brakes of the kind set forth are located side-by-side within a stationary housing, the friction discs of both brakes being mounted on a common shaft extending through the housing, and the torque on the pressure plates of both brakes is taken by a common pin which is mounted in the housing and of which the axis is parallel to that of the shaft.

This arrangement has several practical advantages. One of these is that it permits the use between the brakes of a central stationary torque-taking member of minimum thickness.

Other advantages are that it avoids the provision of a support between the brakes which would be necessary if separate pins were used, it ensures that the brake actuators which are diametrically opposite the pin are mutually parallel, which is important when long actuating linkages are employed, and it ensures the correct angular location of the actuators relative to the pilot lugs if these are cast on to a central part of the housing.

According to a further feature of our invention a dish-shaped stationary torque-taking member located in the housing between the brakes provides stationary braking surfaces for the adjacent friction discs of the two brakes and also pilot lugs for supporting and locating the pressure plates.

Our improved brake assembly is particularly adapted for braking a shaft forming part of the transmission of a tractor, and one form of brake assembly for that purpose is illustrated by way of example in the accompanying drawings wherein:

FIG. 2 is a vertical elevational view of the dish-shaped stationary torque taking member of the invention; and FIG. 3 is a vertical cross-sectional view taken substantially on the line 3—3 of FIG. 2.

Figure 1:
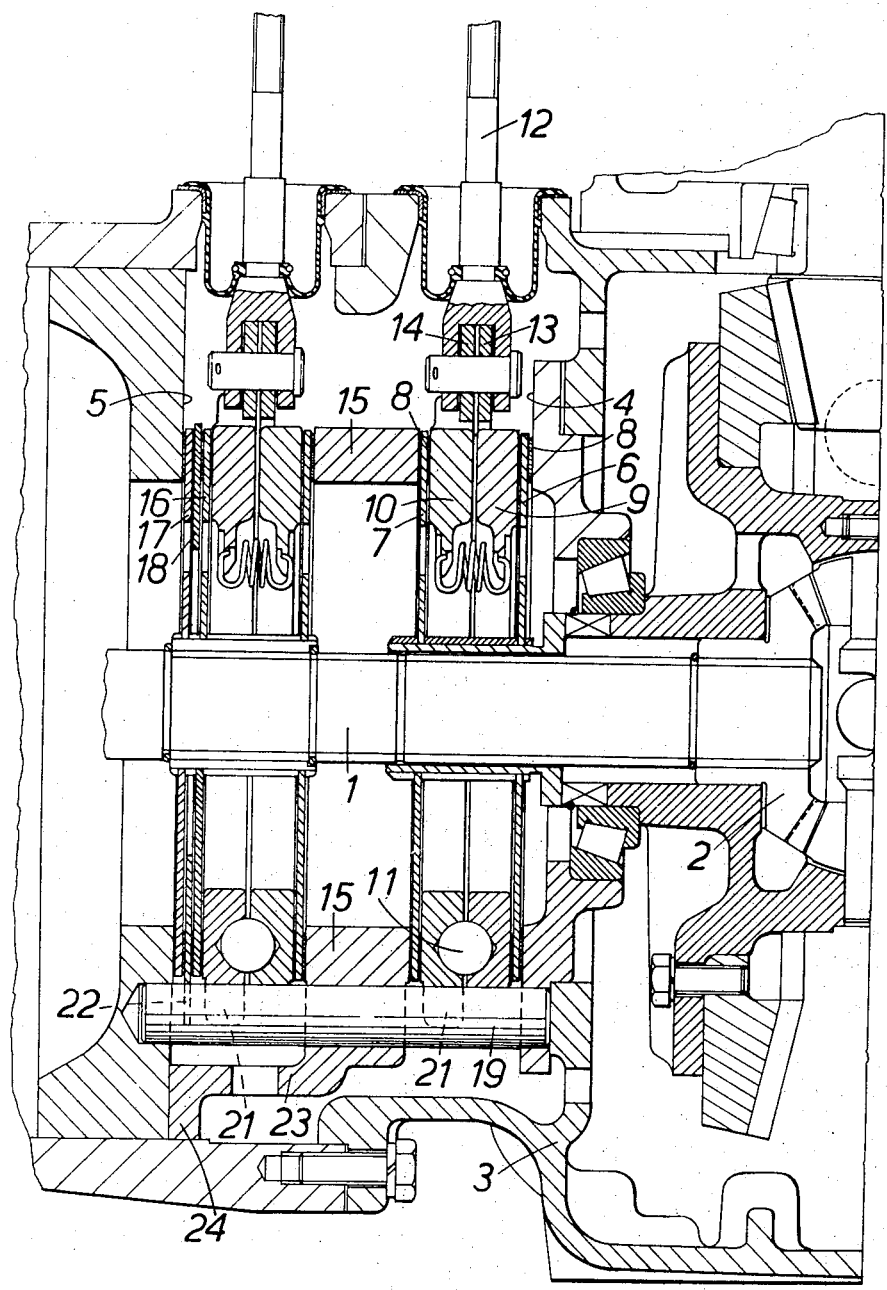
FIG. 1 is a longitudinal section in a plane containing the axis of the shaft.

A shaft 1, which in the embodiment illustrated is a half-shaft taking the drive from a differential 2 to a wheel, is rotatably mounted in bearings in a housing 3 providing axially spaced radial braking surfaces 4 and 5. Located between these surfaces are two independent brakes. In the right hand brake there are two discs 6 and 7 carrying rings of friction material 8, the discs being splined or otherwise slidably keyed on the shaft. Two angularly movable pressure plates in the form of rings 9, 10 are located between the discs, and balls 11 are located in oppositely inclined co-operating recesses in the adjacent faces of the plates. Relative angular movement between the pressure plates to initiate the application of the brake is produced by a radial pull-rod 12 connected by toggle links 13, 14 to lugs on the plates as is common in brakes of this kind.

When the pressure plates are urged apart by the balls the disc 6 is brought into frictional engagement with the surface 4 in the housing and the disc 7 is brought into engagement with a stationary member 15 located between the brakes and described below.

The left hand brake is substantially the same as that described above except that on the left of the pressure plates there are two rotatable discs 16, 17 with a stationary disc 18 between them. The outermost rotatable disc 17 co-operates with the braking surface 5 in the housing. A stationary disc similar to the disc 18 may be located between the friction discs 6 and 7 of the right hand brake.

The torque on the pressure plates of both brakes is taken by a common pin 19 of which the length is greater than the combined axial length of the two brakes. The axis of the pin is parallel to that of the shaft 1, and its ends are received in aligned bores in spaced parts of the housing. The pressure plates are formed with lugs 21 adapted to engage opposite sides of the pin according to the direction of rotation of the shaft. The pin 19 also takes the torque on the stationary disc 18 through a slotted lug 22 on the disc.

The stationary member 15 which is located between the two brakes provides radial braking surfaces for engagement by the inner discs of the brakes. The member 15 is of dish-shape having an annular axially extending flange 23 on the free end of which is a radially projecting lip 24 by which the member is secured to the casing by bolts or other convenient means (not shown) extending through circumferentially spaced openings 25 in the lip 24.

The lower end of the member 15 between the brakes has an opening 26 therein through which extends the adjacent pin 22, and on the upper end are pilot lugs 27, 28 integral with member 15 and which serve with the pin 19 as the sole means for locating and centering the pressure plates of both brakes.

As the brake assembly illustrated is located within the transmission casing of a tractor it will normally be oil-immersed.

As the pin 19 is located at opposite ends in aligned bores in the housing it assists final assembly of the brake by providing a location point, as, for example, when one end of the pin is supported in one part of an axle housing such as an axle trumpet and the other end is supported in another part of the axle housing to which the trumpet is to be joined by bolts.

It may be necessary to provide a small clearance for the pin 19 in the central stationary member 15 to allow for manufacturing tolerances.

In a modification the pin 19 may terminate short of the part of the casing in which the right hand end of the pin is shown in the drawing, the pin being long enough to take the torque from both brakes but being supported only by the central member 15 and by the housing at its left hand end.

I claim:

1. A brake assembly incorporating two brakes of the self-energising spreading disc type located side-by-side within a stationary housing, wherein the friction discs are mounted on a common shaft extending through the housing, a dish-shaped member located within the housing between the brakes and providing stationary braking surfaces for the adjacent friction discs of both brakes, said dish-shaped member including an axially extending flange, means for securing said dish-shaped member to the interior of said housing, a pin mounted in the housing and passing through said dish-shaped member adjacent one end thereof and being engaged by the pressure plates of both brakes to provide a common torque-taking means for said plates, and pilot lugs integral with said dish-shaped member adjacent the end opposite said pin and serving with said pin as the sole means for locating and centering the pressure plates of both brakes.

2. A brake assembly incorporating two brakes of the self energizing spreading disc type located side-by-side within a stationary housing wherein the friction discs are mounted on a common shaft extending through the housing, a dish-shaped member located within the housing between the brakes and providing stationary braking surfaces for the adjacent friction surfaces of both brakes, said dish-shaped member including an axially extending flange, a radially projecting lip on the free end of said flange, and means for securing said lip to the interior of said housing, a pin mounted in the housing and passing through said dish-shaped member adjacent one end thereof and being engaged by the pressure plates of both brakes to provide a common torque taking means for said plates, and pilot lugs integral with said dish-shaped member adjacent the end opposite said pin and serving with said pin as the sole means for locating and centering the pressure plates of both brakes.

3. A brake assembly as in claim 2 wherein a stationary disc is located between adjacent friction discs on at least one side of the pressure plates of a brake and has a slotted lug engaging said common torque-taking pin.

* * * * *